United States Patent [19]
Saito et al.

[11] 4,404,625
[45] Sep. 13, 1983

[54] PROGRAMMABLE LOGIC CONTROLLER

[75] Inventors: Yoshitane Saito, Kameoka; Akihiro Yamada, Kyoto; Satoshi Yano, Nagaokakyo, all of Japan

[73] Assignee: Omron Tateisi Electronics Co., Kyoto, Japan

[21] Appl. No.: 247,284

[22] Filed: Mar. 25, 1981

[30] Foreign Application Priority Data

Mar. 26, 1980 [JP] Japan ................................. 55-38518

[51] Int. Cl.³ ...................... G05B 19/04; G06F 15/46
[52] U.S. Cl. ................................... 364/144; 68/12 R; 364/146; 364/400; 364/900
[58] Field of Search ............... 364/143, 144, 146, 147, 364/400, 200 MS File, 900 MS File; 68/12 R; 134/57 R, 57 D, 113, 58 R, 58 D; 307/41, 141, 141.4, 141.8

[56] References Cited

U.S. PATENT DOCUMENTS

| | | | |
|---|---|---|---|
| 4,184,347 | 1/1980 | Tobita et al. | 364/146 X |
| 4,200,915 | 4/1980 | Struger et al. | 364/146 X |
| 4,245,296 | 1/1981 | Small et al. | 364/146 X |
| 4,245,310 | 1/1981 | Kiefer | 364/146 X |
| 4,328,539 | 5/1982 | Heeger | 364/144 |

Primary Examiner—Joseph F. Ruggiero
Attorney, Agent, or Firm—Cushman, Darby & Cushman

[57] ABSTRACT

A programmable controller connected for receiving the external numerical data from a date setter to the central control unit. Data sets in a numerical data setter can be used as the time data in a timer instruction and count data in a counter instruction when the prescribed code is used and the user program is executed.

4 Claims, 5 Drawing Figures

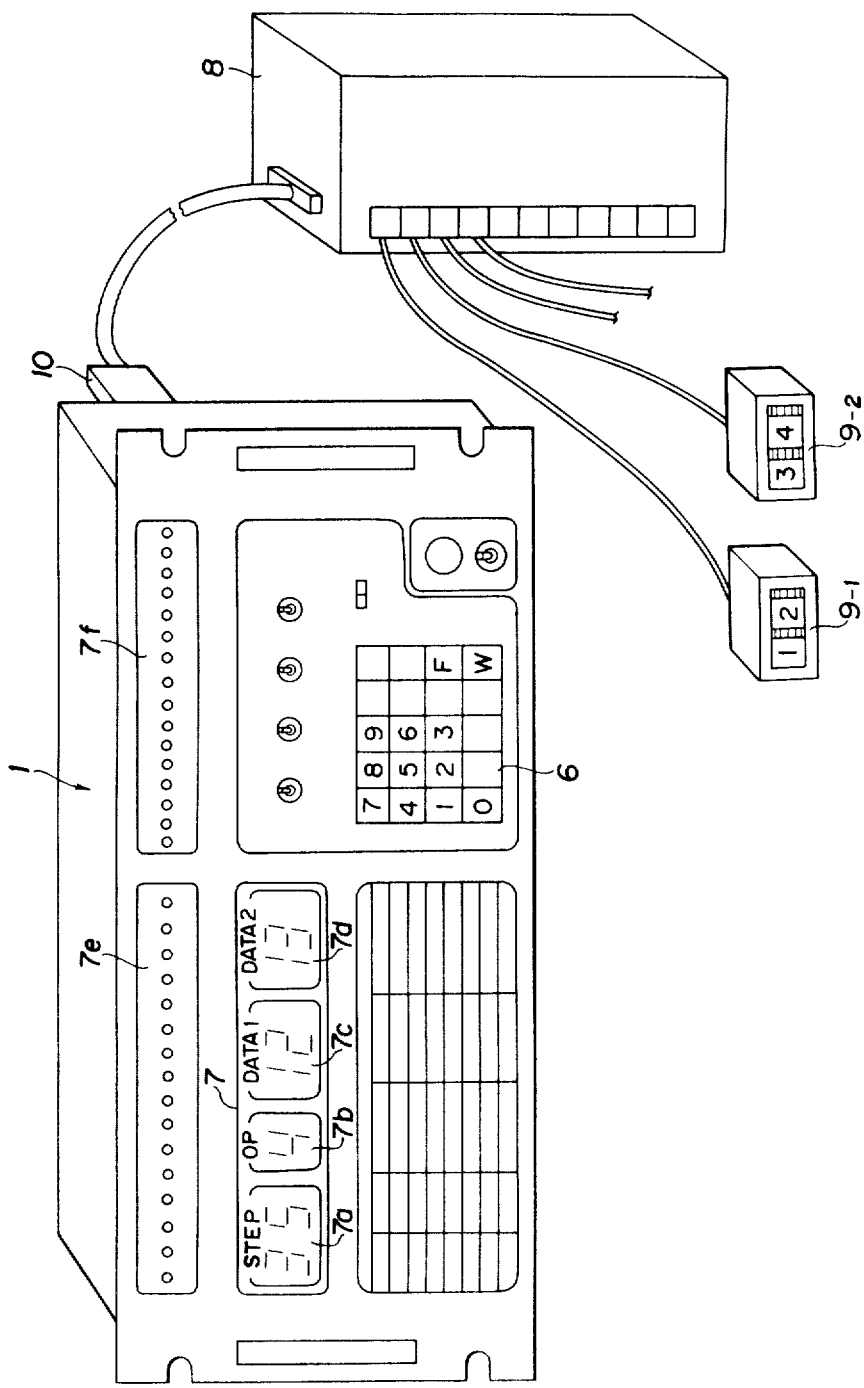

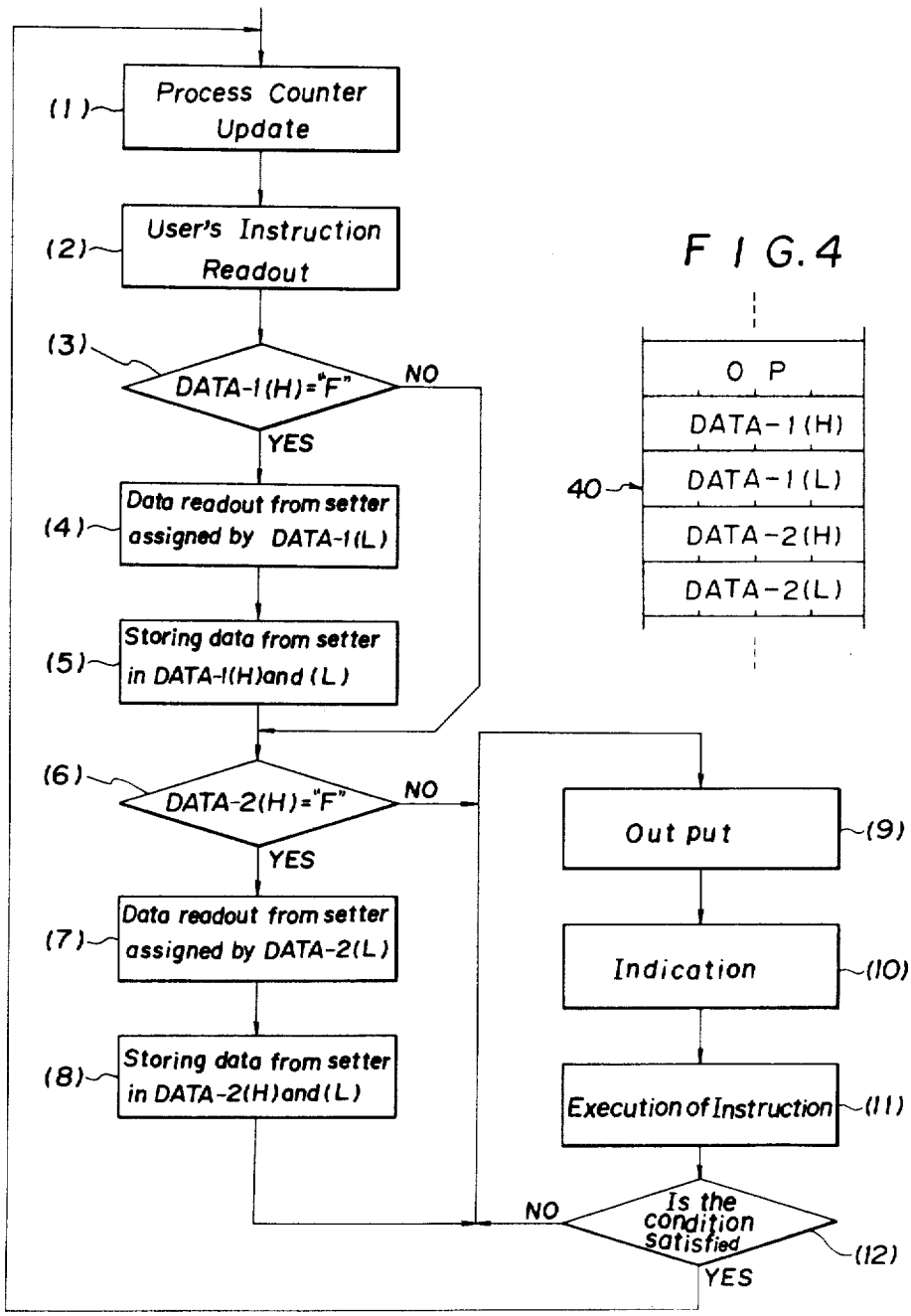
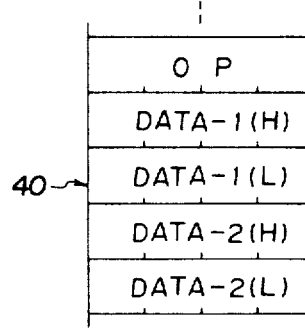

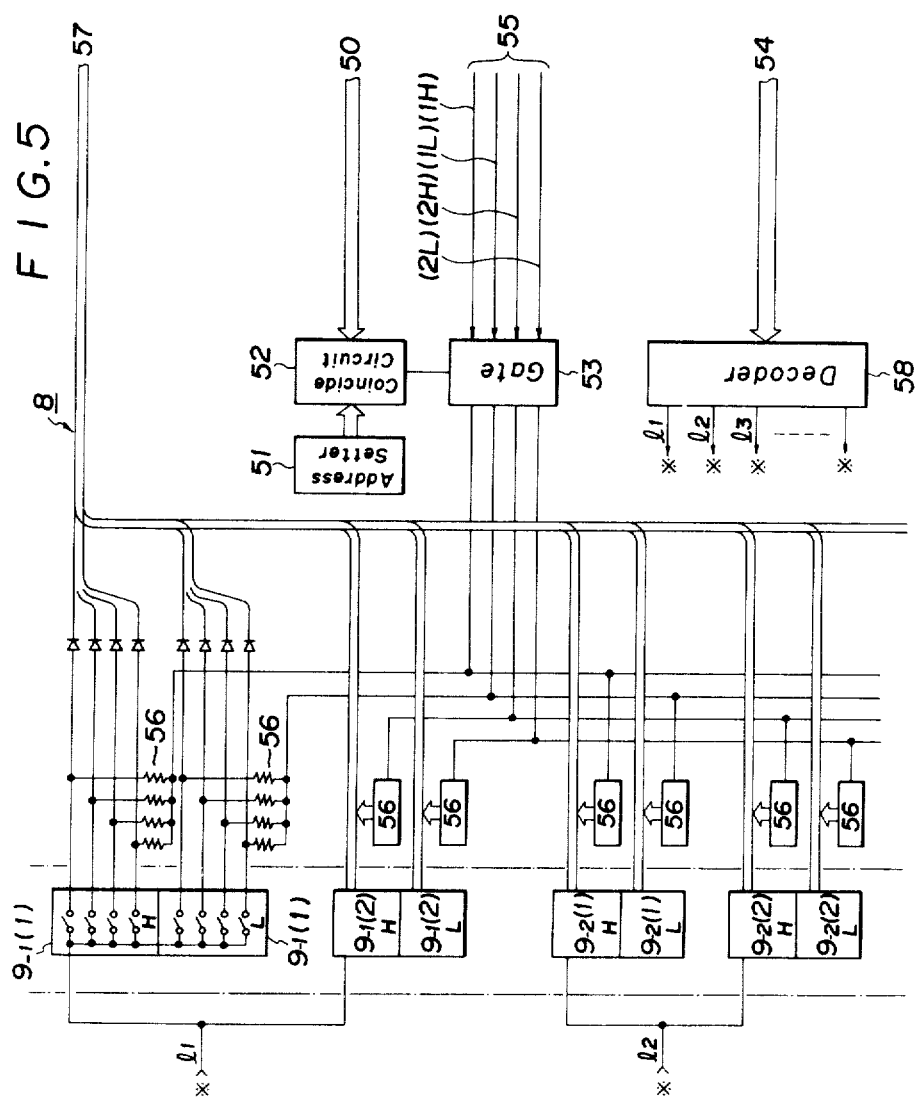

PROGRAMMABLE LOGIC CONTROLLER

BACKGROUND OF THE INVENTION

The present invention relates to an improvement upon an universal logic controller of the stored program type, that is, a programmable logic controller.

In the area of various kinds of machine and process controls, stored program type universal logic controllers have been widely utilized in recent years in place of conventional wired logic type controllers comprising in combination relays, counters and timers.

As well known, the basic features of this kind of programmable logic controllers are that they can respond to various control specifications by means of the set program which can be easily modified. However, currently known programmable logic controllers are frequently more inconvenient in a certain aspect in actual uses than the wired logic type controllers. This problem will occur when they are used, for example, for control specifications described hereinafter.

As a typical example of a very simple case, the control of an industrial washing machine will be described below. In a controller for performing a combination of operations of an industrial washing machine in a predetermined sequence (start of water filling, stop of water filling, start of draining, stop of draining, detergent filling, drive and stop of pulsator, start of dewatering, stop of dewatering, etc.) it will be assumed hereinafter that part of flow of the control such as "washing time" and "the number of repetitions of the rinse and dewatering" is required to be frequently changed depending upon the kind of clothing to be washed, while the basic control procedure of the whole from the first start of water filling to the last stop of dewatering will remain unchanged.

In this case, in the conventional controller having a wired logic circuit, a variable type timer capable changing the setting time can be used for determining "the washing time" and a preset type counter can be used for determining "the number of repetitions of the rinse and dewatering". Then, these times and counters can be mounted on the most convenient places for workers separately from the controller of the washing machine. If "washing time" is indicated on the timer and "the number of repetitions of rinse and dewatering" is shown on the counter, any ordinary worker who has no knowledge of control engineering may be able to easily and correctly change the operation stated above, as long as he knows how to set the timer and counter. In addition, by just looking at the indications of setting time of timer and the preset value of the counter, "washing time" and "the number of repetitions of rinse and dewatering" currently set can be confirmed by the worker at any time.

On the other hand, if a conventional type of programmable logic controller is adopted as the controller for said washing machine, the control procedure for the washing machine must be expressed in accordance with the predetermined instruction system and written in the program memory of the controller, and the instructions for determining "washing time" and "the number of repetitions of rinse and dewatering" will become part of the program consisting of a number of combined instructions. Therefore, "washing time" and "the number of repetitions of rinse and dewatering" can be naturally changed by rewriting the corresponding instructions in the program memory. However, it can be said that changing such a program is much more difficult compared with the operation of a timer for "washing time" and a counter for "the number of repetitions" for wired logic type systems described previously.

Instruction systems and setting methods for programs for programmable logic controllers have been improved and simplified in many aspects, and even a kind of controller called "process stepping type", with which any required control operation can be easily realized by workers who have no special knowledge of control circuitry, is already known and available. However, if a certain change or setting of its program is needed, workers have to know at least the operating sequence of such controllers and the coded instructions.

Thus, if time data of "timer instructions" or numerical data of "counter instructions" which is only a very small part of the whole control program are going to be revised in order to change the "washing time" or "the number of repetitions of rinse and dewatering", it is first required to find the step numbers of instructions in program for "washing time" and "the number of repetitions" by checking the program lists or by sequentially monitoring the program. Then, an area in the program memory corresponding to the step number previously found has to be located and new instructions for the change have to be entered there. This operation is the same as a program setting operation, and any simple error during key operation for changing the instructions may alter other instructions not related to "washing time" and "the number of repetitions". Thus, even the operation for changing only a small portion of instructions cannot be performed quickly and accurately by workers who have no knowledge of the instruction system and the operating method of the controllers. That is, such conventional programmable controllers are not suited to such washing machines for which "washing time" and "the number of repetitions of rinse and dewatering" have to be frequently changed by ordinarly workers in response to the kinds of clothing to be washed. Even though a program indicator is provided in a conventional controller, only the instructions of the step being executed or the instructions of the step designated by the monitoring operation are indicated in the coded form, so that currently set "washing time" and "the number of repetitions of rinse and dewatering" cannot be easily confirmed. In addition, setters for "washing time" and "the number of repetitions" for such controller cannot be installed at places which are very easily accessible to workers.

BRIEF SUMMARY OF THE INVENTION

A primary object of the present invention is to provide a programmable logic controller which can be used easily.

Another object of the present invention is to provide a programmable logic controller for which part or the whole of the modified data of the control program stored in the program memory can be directly rewritten by an external data setter without performing the ordinary program-rewriting operation.

Another object of the present invention is to provide a programmable logic controller whose numerical data setter described before can be installed in a place easily accessible to an operator independently from the location of installation of the controller unit.

Another object of the present invention is to provide a programmable logic controller for which the counting and set points for the counting operation can be changed as required by an external numerical data setter if a control program containing the counting operation is to be executed.

It is a further object of the present invention to provide a programmable logic controller whose time set points for the timer operation can be changed as required by an external numerical data setter if a control program containing said timer operation is to be executed.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

FIG. 2 is an external view of the programmable logic controller of the present invention, FIG. 3 is a flowchart to aid a better understanding of the operation of the central control unit, FIG. 4 shows the conditions of instructions stored in data RAM, and FIG. 5 is a bus control circuit diagram for an embodiment of bus controller of the present invention.

DETAILED DESCRIPTION

Figure 1:
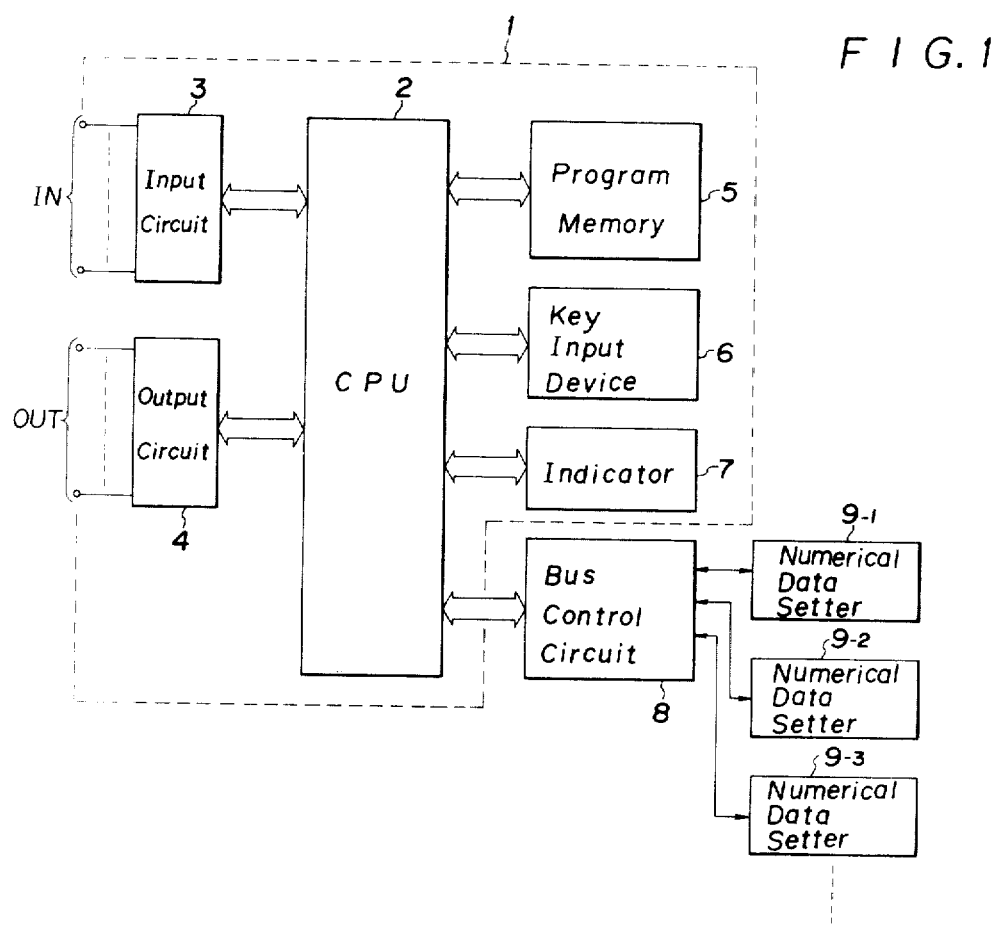
FIG. 1 is a block diagram showing the electrical configuration of the programmable logic controller of the present invention.

Referring to the drawings, a controller 1 of the present invention is provided with a central control unit (CPU) 2 consisting of a so-called microcomputer as firmware, an input circuit 3 as an input interface between the external switches connected to input terminals IN and the central control unit 2, an output circuit 4 for controlling external equipment connected to the output terminals OUT in response to the output signals from the central control unit 2, a program memory 5 for storing the sequence program set by users as desired, a key input device 6 to be used for monitoring or setting program, and an indicator 7 for indicating the instruction being set at the time of program setting and also instructions being executed during execution of the program. In addition, it is so arranged in the present invention that plural external numerical data setters 9-1, 9-2, 9-3, . . . can be connected through a bus control circuit 8 to the controller 1. A connector 10 for connecting the bus control circuit 8 to the central control unit 2 is shown in FIG. 2.

User's instructions for each process unit of the controller have the format as shown below.

| Process update instruction | | |
|---|---|---|
| Instruction code | Modified data | Output control instruction |
| OP | DATA-1  DATA-2 | OUT |

Process update instructions are the instructions expressing the conditions for shifting a certain process to subsequent process, and each instruction can be divided into instruction code "OP" and modified data "DATA-1" and "DATA-2". Instruction code "OP" consists of 4-bit data and expresses the kind of processing operation. Each of the modified data "DATA-1" and "DATA-2" consists of 8 bits (2-digit binary coded decimal code, but 4-digit binary coded decimal code for the modified data as a whole) and has the functions as numerical data to actually particularize the processing operation of that kind expressed by the instruction code.

The output control instruction "OUT" expresses the contents of the output control during the execution period of that process and is the data having the same number of bits as that of the output terminals corresponding in one-to-one ratio to the output terminals of the output circuit 4 (express the on and off state of each output terminal respectively).

Indicator 7 comprise, as shown in FIG. 2, a 2-digit indicator 7a for displaying the process number (step number), a 1-digit numerical indicator 7b for converting the instruction code "OP" to a decimal number and displaying it, numerical indicators 7c and 7d for displaying the modified data "DATA-1" and "DATA-2" in four digits (these numerical indicators can display decimal points), LED lamp array 7e corresponding in number to the output terminals for indicating the output control instructions (output conditions), and LED lamp array 7f corresponding in number to the input terminals for indicating the input conditions.

A typical instruction code and the contents of its execution in the programmable controller of the present invention will be briefly described hereinafter.

(a) "NOP": No-operation instruction

No operation is performed and the machine advances to subsequent process number.

(b) "END": End instruction

Completion of one cycle processing is expressed.

(c) "JMP": Jump instruction

A jump to the step of process number assigned by "DATA-1" is performed and then subsequent execution is performed. When the input terminal number is programmed in "DATA-2", a jump to the process number assigned in "DATA-1" is performed using the input assigned by "DATA-2", and then the execution is continued.

(d) "AND": AND instruction

When input signals appear at two input terminals whose numbers are assigned by "DATA-1" and "DATA-2", the machine will progress to the subsequent process number.

(e) "OR": OR instruction

In response to the input signal which came first to either one of two input terminals whose numbers are assigned by "DATA-1" and "DATA-2", the machine will advance to the step of subsequent process number.

(f) "CNT": Count instruction

The input signal from the input terminal whose number is assigned by "DATA-2" is counted several times until the counting number assigned by "DATA-1" is fulfilled, and, after counting up, the machine will advance to the step of subsequent process number.

(g) "CPJ": Conditional jump instruction

When the input signal appears at the input terminal whose number is assigned in "DATA-2", the machine will jump to the process whose number is assigned in "DATA-1" and, if said input disappears, the machine will advance to the step of subsequent number.

(h) "RPT": Repeat instruction

Operation from the process number assigned in "DATA-2" to the current process number is repeated several times until the number of repetitions assigned in "DATA-1" is achieved.

(i) "TIM": Timer instruction

When the time assigned in "DATA-1" and "DATA-2" elapses, the machine will advance to the step of subsequent process number.

The instruction code described above is very well known and the signal processing procedure at the time of execution of the code is also widely known so that no detailed explanation will be made hereinafter.

The controller of the present invention is based upon the well known instruction system and processing method as described above but the new instruction processing method described below has been added.

For the instructions (a) to (i) stated above, the numerical data of BCD code are used in the modified data "DATA-1" and "DATA-2". In the controller of the present invention, if the external data reference command code "F" and the data for specifying one of external numerical data setters 9-1, 9-2, ... have been set in an area of "DATA-1" or "DATA-2", the controller of the present invention is able to read out the data from the assigned external numerical data setters 9-i (i=1, 2, 3, ... ) prior to execution of the instruction, and to execute the instruction by using these numerical data as data of "DATA-1" or "DATA-2".

The external data reference command code "F" stated above is a 4-bit code of "1111" which is not defined by the BCD code, that is, it is a "F" noted in the form of base 16 numeration system. And when this external data reference command code "F" is set at the first digit of "DATA-1" or "DATA-2" and the data for assigning the numerical data setters 9-1, 9-2, ... are set at the last digit in this area, the instruction is executed after making the external data reference. Also, keys for writing the code "F" in the program memory 5 are provided in the key input device 6.

FIG. 3 is a flowchart showing the basic operating procedure of the central control unit 2 defined by the system program stored in ROM of the unit, and particularly the process of instruction execution after the external data reference related to the main portion of the present invention is indicated in this flowchart.

Making reference to this flowchart, the process counter will advance during routine (1), then the instructions (process update instruction and output control instruction) with the process number assigned by the process counter are read out of the program memory 5 during routine (2) and stored in data RAM of the central control unit 2. FIG. 4 shows the stored format of the process update instruction in data RAM 40 of the central control unit 2. As shown there, the process update instructions read out of the program memory 5 are stored separately 4 bits apiece in the data RAM 40. In this figure, OP shows the instruction code, DATA-1 (H) the first digit of said modified code "DATA-1", DATA-1 (L) the last digit of that code, DATA-2(H) the first digit of modified code "DATA-2", and DATA-2(L) the last digit of that code respectively.

In the subsequent routine (3), it is checked whether the modified data DATA-1(H) stored in data RAM 40 are the external data reference command code "F", and a jump to routine (6) is made if the data are not the code "F". In routine (6), it is checked whether the modified data DATA-2(H) stored in data RAM 40 are the external data reference command code "F", and a jump to routine (9) is made if the data are not the code "F".

In routine (9), said output control instruction "OUT" in user's instructions read out is transferred to the output circuit 4, and the output condition set by the user's instructions is taken out from the output terminal OUT.

In subsequent routine (10), the user's instructions read out of the program memory 5 are indicated on the indicator 7. (In the preceding routine (2), the user's instructions read out were also stored in the indication data area of data RAM in the central control unit 2.)

In the subsequent routine (11), the process update instructions OP. DATA-1(H), DATA-1(L), DATA-2(H) and DATA-2(L) stored in said data RAM 40 are decoded and executed. The ordinary instruction codes (a) to (i) were already described before and their processing will not be stated any further, but an example of processing of AND instructions will be described herewith. For the AND instruction, it is checked whether AND condition occurs with respect to the input signal from the input terminal whose number is assigned by DATA-1(H) & (L) and the input signal from the input terminal whose number is assigned by DATA-2(H) & (L). If AND condition does not occur, the controller will return to routine (9). That is, if AND condition does not occur with respect to two input signals assigned, routines (9), (10) and (11) are repeated. However, if this AND condition occurs, the machine will return to its first routine (1) causing the process counter to advance or, if jump instruction has been executed, the process whose number was assigned by the process counter will be then preset.

When the external data reference command code "F" is detected at DATA-1(H) of data RAM 40 during routine (3), the machine advances to routine (4) and the numerical data set at the numerical data setter 9-i assigned by DATA-1(L) of data RAM 40 is read out. Each numerical data setter 9-i(i=1,2,3, ... ) comprises digital switches capable of setting 2-digit decimal number, and its output is read out in the form of 2-digit BCD code through the bus control circuit 8 by the central control unit 2.

In subsequent routine (5), 2-digit numerical data read out from the numerical data setter 9-i(i=1,2,3, ... ) during routine (4) are stored in the areas of DATA-1(H) & (L) of data RAM 40. That is, DATA-1(H) of user's instruction read out of the program memory 5 are the external data reference command code "F" and DATA-1(L) are the data for assigning the setter 9-i (i=1,2,3, ... ). However, by executing the routines (3),(4) and (5), the DATA-1(H) and (L) are replaced with the data set by the assigned setter 9-i (i=1,2,3, ... ). Then, if NO is determined during subsequent routine (6), the machine advances to routines (9),(10) and (11), and the instruction using the data which have been set by the setter 9-i (i=1,2,3, ... ) and replaced as "DATA-1" of the modified data is executed.

Also, when the external data reference command code "F" is detected at DATA-2(H) of data RAM 40 during the routine (6), the machine advances to routine (7), reads out the numerical data set by the numerical data setter 9-j (j=1,2,3, ... ) assigned by the DATA-2(L) of data RAM 40 and, during routine (8), stores the data read out of setter 9-j (j=1,2,3, ... ) in the areas of DATA-2(H) and (L) of data RAM 40. Then, the machine advances to subsequent routines (9), (10) and (11), and the instruction using that data replaced and set by the setter 9-j (j=1,2,3, ... ) as "DATA-2" of the modified data is executed.

As easily understandable from the above description, if there is a repeat instruction as shown below at m-th process of the user's program, the following process will be executed:

| STEP | OP | DATA-1 | DATA-2 |
|------|-----|--------|--------|
| m | RPT | "F" 5 | m-8 |

The process from process numbers(m-8) to m is repeated until the number of repetitions becomes equal to the number set by the numerical data setter 9-5 whose number is 5, then the machine advances to subsequent process number (m+1). In actual control of the washing machine previously described, if one cycle from rinse to dewatering will be completed while it advances from process number (m-8) to m, the numerical data setter 9-5 acts as a setter for "the number of repetitions from rinse to dewatering". In addition, since this setter is an external device, it can be installed at any desired location separated from the body of controller 1, and its set points can be confirmed at any time. Also, setting operation for this kind of setter (digital switch) is very simple, and any ordinary person may be able to perform such setting operation very easily and properly.

In addition, the timer instruction shown below will be processed as follows:

| STEP | OP | DATA-1 | DATA-2 |
|------|-----|--------|--------|
| n | TIM | "F" 2 | "F" 3 |

That is, if the set points set by the numerical data setters 9-2 and 9-3 whose setter numbers are 2 and 3 respectively would be "12" and "34" respectively for instance, the output condition of the process number n will continue for 12 minutes and 34 seconds and then the machine advances to subsequent process number (n+1). If this timer instruction is used as an instruction to determine the "washing time" described before, the external numerical data setters 9-2 and 9-3 will function as setters for "washing time".

The following conditional jump instruction will be processed as follows:

| STEP | OP | DATA-1 | DATA-2 |
|------|-----|--------|--------|
| l | CJP | m+1 | "F" 4 |

That is, when the input signal at the input terminal set by the numerical data setter 9-4 having the setter number 4 is in ON state, the machine will jump to the process number (m+1). And when it is in OFF state, the machine advances to the subsequent process number (l+1).

The following count instruction will be processed as follows:

| STEP | OP | DATA-1 | DATA-2 |
|------|-----|--------|--------|
| l+1 | CNT | "F" 6 | 1 3 |

That is, the input signal from the input terminal number 13 will be counted until the number set by the numerical data setter 9-6 having the setter number 6 is exceeded, and then the machine advances to subsequent process number (l+2).

Even though the assignment number of setters 9-i (i=1,2,3, . . . ) accompanied by the external data reference command code "F" is the same for different setters, the number of external setters assignable by 4-bit data can be increased as long as it is allowed to assign the different setters 9-i (i=1,2,3, . . . ) depending upon whether said assignment number is in DATA-1(L) or DATA-2(L). FIG. 5 shows an embodiment of the bus control circuit 8 corresponding to the case described above.

In FIG. 5, the setters 9-1(1) and 9-1(2) are the No.1 setters, and the setter 9-1(1) is selected when assigned as "1" by DATA-1 (L) while the setter 9-1(2) is selected when assigned as "1" by DATA-2(L). Also, the setter 9-1(1) is for first digit if it is shown by 1H and is for last digit if it is shown by 1L. The output of each setter is expressed by 4-bit BCD code. But other codes also have the same meaning.

Now, the configuration and operation of the bus control circuit will be described hereinafter by making reference to the operation of readout of set data by the central control unit 2 in accordance with the following modified data:

| DATA-1 | DATA-2 |
|--------|--------|
| "F" 1 | "F" 2 |

Central control unit 2 will place on the bus line 50 the address data set at address setter 51 assigned by the bus control circuit 8. Then, a coincidence signal is sent out of the coincidence circuit 52 and the gate 53 is opened.

Then, data "1" of DATA-1(L) are placed on bus line 54, and decoded by the decoder 58, causing the line $l_1$ to be in low level. Then, only the line 1H of bus line 55 becomes high level. Then, readout voltage is applied through the pull-up resistor 56 to the setter 9-1(1H) and the line $l_1$ is in low level state, so that the set data at the setter 9-(1H) are transferred through an OR circuit made of diodes onto the bus line 57. The central control unit 2 stores these data in DATA-1(H). Then, only the line 1L in bus line 55 becomes high level. And readout voltage is applied through pull-up resistor 56 to the setter 9-1(1L), and the set data at the setter 9-(1L) are transferred into the bus line 57. Then, the central control unit 2 stores these data in DATA-1(L).

Then, the data "2" in DATA-2(L) are placed on the bus line 54. And only the output line $l_2$ of the decoder 58 turns to low level. At the same time, only the line 2H of the bus line 55 becomes high level. Then, the readout voltage is applied to the setter 9-2(2H) while only the line $l_2$ is in low level state, so that the set data at this setter 9-2(2H) is transferred to the bus line 57. Then, the central control unit 2 will store these data in DATA-2(H). And only line 2L of bus line 55 becomes high level. Then, the readout voltage is applied to the setter 9-2(2L), and the set data of this setter 9-2(2L) are transferred to the bus line 56. The central control unit 2 stores these data in DATA-2(L). Thus, the readout of set data and the data replacement process will be completed.

In the embodiment stated above, the present invention has been explained for applications to a process stepping type controller, but the applications of the present invention are not limited only to such controller but can be also extended to so-called scanning type controllers in the same manner.

As described above in detail, the programmable controller of the present invention is capable of setting the predetermined "external data reference command" code and the data for specifying the external setter in the area of modified data for concretely particularizing the processing operation of the kind expressed by the instruction code, to replace the data in the modified data area with the data set in the external numerical data setter, and to execute the corresponding instruction. Therefore, the basic instruction system does not change (the kind of the instruction code does not change) and only part of the modified data is handled, so that the program preparation method is very simple and the inherent features of the controller of this kind such as ease in preparing and revising the program will be maintained. In addition, being different from the conventional types of controllers, relatively frequent changes of modified data for very small part of instruction in the program can be performed only by the data setting operation at the external numerical data setters corresponding in one-to-one ratio to the items to be changed instead of using any input device for making changes. In addition, these set data can be confirmed at any time when necessary.

As many apparently widely different embodiments of this invention may be made without departing from the spirit and scope thereof, it is to be understood that the invention is not limited to the specific embodiments thereof except as defined in the appended claims.

We claim:

1. A programmable logic controller comprising:
   (a) a program memory for storing a program expressed in the form of a combination of a first instruction code for indicating the kind of process operation and a second instruction code containing modified data to specify the operating conditions of the process operation of the kind expressed by said first instruction code;
   (b) a plurality of external numerical data setters for manually entering numerical data relating to said operating conditions;
   (c) an input device for writing any desired program into said program memory and for entering a specific code indicating external data has been entered in at least one of said data setters so that an external data reference command is stored in a predetermined area of said modified data;
   (d) a central processing unit (CPU) for sequentially reading out such instructions stored in said program memory and for sending out control signals in conformity with said instructions, the CPU having connecting means for connecting said plural external numerical data setters to said CPU;
   (e) reference command code detection means for checking whether external data reference command is present in said predetermined area of modified data of said instruction read-out prior to the execution of the instruction read-out from said program memory;
   (f) numerical data read-out means to read-out the numerical data set at a data setter when such an external data reference command is detected; and
   (g) replacement control means replacing the part or the whole of the modified data of that instruction containing said external data reference command code in the modified data with data readout from said external numerical data setter.

2. The programmable logic controller of claim 1, said controller being of the process stepping type.

3. The programmable logic controller of claim 1, said controller being of the scanning type.

4. The programmable logic controller of claim 1, said connecting means being connected through the bus control circuit to said plural numerical data setters.

* * * * *